United States Patent Office 3,127,410
Patented Mar. 31, 1964

3,127,410
2-(2'-HYDROXY-4'-AMINO-PHENYL)-1:3:4 - OXADI-AZOLONE, THE CORRESPONDING OXADIAZOL-THIONE AND DERIVATIVES THEREOF
Arthur Ernest Wilder Smith, 18 Chemin des Lilas Blancs, Geneva, Switzerland
No Drawing. Filed Feb. 10, 1961, Ser. No. 88,305
Claims priority, application Great Britain Feb. 12, 1960
6 Claims. (Cl. 260—307)

This invention is concerned with chemical compounds of therapeutic activity.

It is known that a number of compounds which are administered for therapeutic purposes give rise on administration to side effects in varying degrees which may well be troublesome and which may contra-indicate prolonged use. For example aspirin can give rise to troublesome gastric irritation. It is observed that side effects are frequently to be found with therapeutic compounds possessing a carboxyl group.

I have now found that in general it is possible to reduce side effects often associated with the presence of a carboxyl group in a therapeutic substance by conversion of such group into an oxadiazolyl group. The compounds so produced in general possess substantially the same therapeutic activity as the parent compounds although slight differences may be exhibited. Thus, for example, in antibacterial substances differences in the anti-bacterial spectrum and the resistance emergence rates towards various bacteria may occur.

For convenience I use the term "therapeutic substance" to mean any chemical substance which may be given for medical purposes and irrespective of whether such substance has any curative effect. The term thus includes apart from curative substances, contrast agents, anaesthetics etc.

This invention particularly concerns ring-substituted salicylates having free carboxylic groups, such as for example aspirin (acetylsalicylic acid) and p-amino salicylic acid (PAS) which, as is known, is of considerable use in the treatment of tuberculosis.

According to the present invention I provide compounds of the general formula

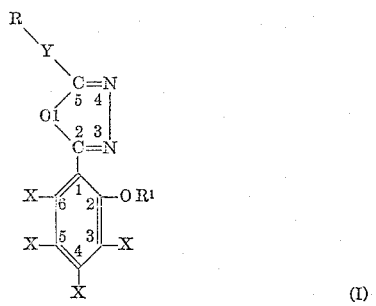

(I)

(in which R and R¹, which may be the same or different, are hydrogen atoms or acyl, alkyl, aralkyl or aryl groups; Y is an oxygen or sulphur atom and the symbols X which may be the same or different represent hydrogen or halogen atoms or substituted or unsubstituted amino, hydroxy, acyl, alkyl, aralkyl or aryl groups or nitro groups but do not all represent hydrogen when R and R¹ are hydrogen and Y is oxygen).

The compounds of Formula I above in which R is hydrogen may exist in tautomeric forms of the general formula

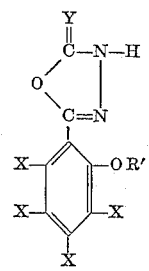

and such tautomeric forms fall within the scope of the present invention.

The salts with physiologically compatible bases of the compounds according to the invention in which one or both of the substituents R and R¹ is hydrogen and the physiologically acceptable acid addition salts of those compounds in which one or more of the substituents X is a basic group constitute still further features of the invention. Such salts are frequently more soluble in water than the parent substance, as is the case with the hydrochloride of 2-(2'-hydroxy-4'-amino-phenyl)-1,3,4-oxadiazolone. Preferred salts with bases are the alkali metal, e.g., sodium, and ammonium salts and preferred acid addition salts are hydrochlorides, hydrobromides, sulphates, acetates, citrates, tartrates etc.

Where one or both of the groups R and R¹ are acyl groups, lower aliphatic acyl or benzoyl groups are preferred.

Particularly useful compounds covered by the Formula I above, which are new compounds, are those in which the phenyl group has an amino or substituted amino group, a chlorine atom, or a methyl group as a ring substituent, or a further substituent OR¹, and in which either one or both of the groups R and R¹ are hydrogen, lower acyl groups, for example acetyl groups, or lower alkyl groups for example methyl, ethyl or n- or iso-propyl groups. Compounds derived from γ-resorcylic acid, i.e., in which X is a hydroxyl group in the 6-position, are especially preferred. Examples of such compounds are those prepared according to examples set out below.

The following compounds are of particular use as antiphlogistic, antipyretic and analgesic agents:

2-(2':6'-dihydroxyphenyl)-1:3:4-oxadiazolone
2-(2':5'-dihydroxyphenyl)-1:3:4-oxadiazolone
2 - (2':6' - dihydroxy-3':5'-dichloro-4'-methyl-phenyl)-1:3:4-oxadiazolone
2 - (2':6' - dihydroxy - 4' - benzyl-phenyl)-1:3:4-oxadiazolone
2-(2'-hydroxy-3'-methyl-phenyl)-1:3:4-oxadiazolone
2-(2'-hydroxy-5'-chloro-phenyl)-1:3:4-oxadiazolone Of these 2-(2':6'-dihydroxyphenyl)-1:3:4-oxadiazolone and 2 - (2':6'-dihydroxy-3':5'-dichloro-4-methyl-phenyl)-1:3:4-oxadiazolone have particularly high antiphlogistic activity.

The compounds of the undermentioned formula:

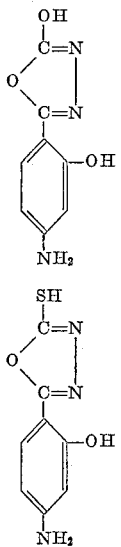

according to the invention or their tautomers, which are derivatives of p-aminosalicylic acid (PAS), show an activity against H 37 Rv (human tuberculosis) in vitro at least comparable to this compound, which as is known is also active against tuberculosis, without the same risk of gastro intestinal irritation arising. PAS has considerable utility in inhibiting the emergence of resistance against isonicotinic acid hydrazide and streptomycin in the treatment of tuberculosis, but the stomach irritation caused by the necessarily large doses required is a serious drawback to its use. By administering this compound in the form of its oxadiazolyl derivatives of the above formula this disadvantage can be substantially overcome. The N-acyl derivatives for example the N-benzoyl and N-lower aliphatic acyl, e.g., acetyl derivatives, of the above p-amino compounds are of special interest and the N-acetyl derivative of p-amino-salicylic acid oxadiazolone has especially low toxicity.

The compound represented by the formula:

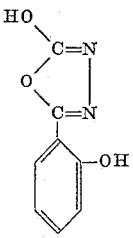

is another example of a compound with a modified carboxylic acid group and I have found that this compound has analgesic properties comparable to aspirin and yet is somewhat less toxic as judged by toxicity tests on mice; it also possesses pronounced antiflammatory and antipyretic properties. It has a more nearly neutral pH in water than aspirin which reduces the liability of gastrointestinal irritation on administration.

The mono- and di-esters, for example the mono- and di- acetate, and mono- and di-ethers, for example the diethyl and the monomethyl ether, of the above compound have desirable analgesic and anti-pyretic properties whilst having a more neutral pH than aspirin.

The diazolones according to the invention may be prepared by any convenient method and various methods for the production of diazolones are known. A suitable method of preparation, for example is first to prepare the hydrazide of the parent carboxylic acid and then to treat the hydrazide with an agent serving to convert a hydrazide into an oxadiazolene or oxadiazol-5-thione, for example, a carbonyl or thiocarbonyl dihalide such as phosgene or thiophosgene or a haloformic ester of a dialkyl carbamyl halide. If the oxadiazolone is required phosgene is preferred; if the oxadiazol-5-thione is required thiophosgene is preferred. Haloformic esters and dialkyl carbamyl halides may be used in place of phosgene. (Stempel et al., J. Org. Chem. 20, 1955, pp. 412–418, and Yale et al., J.A.C.S. 76, 2203 (1954).) Where the hydroxyl group of the oxadiazolyl ring is to be etherified or esterified this can be achieved by reaction with an etherification agent such as a diazoalkane or an alkyl halide or sulphate or an acylating agent such as a carboxylic acid, preferably a lower alkanoic acid, halide, anhydride or azide.

The formation of the diazolone ring may take place in one or two stages depending partly upon the reaction conditions. In the case of phosgene and thiophosgene, reaction with the hydrazide at room temperature leads directly to the diazolone. Haloformic esters and dialkyl carbamyl halides generally react first at the $NH_2$ group of the hydrazide and then split out alcohol or a dialkylamine in a second stage, for example, at a higher temperature.

The reaction between the halide and the hydrazide of the parent acid may be carried out at any convenient temperature, for example between —20° C. and 100° C., room temperature being often suitable although it may be advantageous to operate at temperatures above room temperature. The reaction is conveniently carried out in an inert organic solvent which may, for example, be an anhydrous non-polar solvent, e.g., an ether such as dioxan, or a polar solvent such as glacial or aqueous acetic acid or even aqueous media such as dilute hydrochloric acid. In general, the choice of solvent will depend largely upon the solubility characteristics of the hydrazide. Anhydrous solvents are preferred since the carbonyl dihalides tend to decompose in aqueous media. Phosgene generally reacts to liberate HCl without an acid binding agent being present but less reactive halides are preferably reacted with the hydrazide in the presence of an acid binding agent such as a tertiary organic base, e.g., pyridine or trimethylamine, or an inorganic base such as an alkali metal carbonate etc. Phosgene will in general be used as a gas, although liquid under pressure may be used. The gas can be passed through a solution of the hydrazide to be reacted in solution in said inert organic solvent at room temperature or at an elevated temperature, if necessary. In the case of thiophosgene which will, in general, be used in liquid form, the liquid may be added directly to the solution of the said hydrazide at room temperature or at a somewhat elevated temperature. It is particularly advantageous, however, to add a solution of the hydrazide in an inert solvent to a solution of the dihalide in the same solvent or a solvent miscible therein. Dioxan is an especially suitable solvent.

The hydrazide may conveniently be prepared by the reaction of hydrazine with an ester of the parent acid at any convenient temperature, for example between —20° and 100° C. but preferably at an elevated temperature, the hydrazine preferably being used as hydrazine hydrate, advantageously at 98–100%. The hydrazine is preferably used in excess, the excess being removed after reaction has taken place.

Compounds according to the invention which carry an amino group in the phenyl nucleus may conveniently be prepared by reduction of the corresponding nitro compounds. Thus, for example, p-nitro salicylic acid or a derivative thereof may be esterified, converted to the corresponding hydrazide as described above and reacted with phosgene or thiophosgene to yield the nitro-diazolone or thione which may then be reduced, for example with a metal-acid reducing system such as tin/hydrochloric acid or by catalytic reduction. Catalytic reduction is not recommended, however, where sulphur containing substances are concerned since the catalyst, e.g., Adams' catalyst, may be poisoned by traces of sulphur.

Where the hydrazide contains one or more amino groups in the nucleus, these tend to react with the carbonyl or thiocarbonyl dihalide to form complex compounds or isocyanates. Isocyanates are generally formed, in fact, where the dihalide is present in excess, e.g., when a dilute solution of the hydrazide is added to the excess dihalide. Such isocyanates may be easily converted to the desired compounds, for example, by hydrolysis, e.g., a mineral acid such as hydrochloric or sulphuric acid in the presence of dilute acid.

However, the complex reaction products of a hydrazide with a carbonyl or thiocarbonyl dihalide, including isocyanates, are generally found to have similar in vivo and in vitro activity to the simple amino diazolones and such reaction products constitute a further feature of the invention.

Compounds of Formula I in which one or more of the groups X is a free amino group may also conveniently be prepared by condensing an acylamido o-hydroxy benzhydrazide with the carbonyl or thiocarbonyl dihalide or like reagent and subsequently hydrolysing the resulting amide, e.g. with aqueous acid, preferably a mineral acid such as hydrochloric, hydrobromic or sulphuric acid. The reaction with the hydrazide is preferably effected at or below room temperature.

It is particularly convenient to prepare the hydrazide starting material by reacting an acylamido o-hydroxy benzoic acid ester, e.g., an alkyl ester such as the methyl ester, with hydrazine hydrate, preferably 98–100%, at or below room temperature. 30 to 60 minutes at room temperature is generally suitable. In this way hydrolysis of the amido group is substantially avoided. An excess of the hydrazide hydrate is preferably used and the unreacted hydrate may be subsequently removed, for example by low-temperature evaporation or, preferably, lyophilisation.

According to a still further feature of the present invention I provide compositions comprising one or more compounds of the general formula

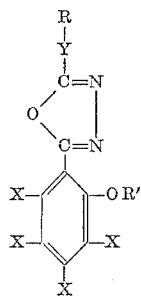

in which R and R¹, which may be the same or different, are hydrogen atoms or acyl, alkyl, aralkyl or aryl groups, Y is an oxygen or sulphur atom and the symbols X, which may be the same or different represent hydrogen or halogen atoms or substituted or unsubstituted amino, hydroxy, acyl, alkly, aralkyl, aryl or nitro groups, together with a pharmaceutical carrier or excipient. The salts with bases of the above compounds in which one or both of the substituents R and R¹ is hydrogen and the acid addition salts of those compounds in which one or more of the groups X is basic may also be formulated in conjunction with a pharmaceutical carrier or excipient.

The compositions according to the invention may, for example, be in forms suitable for oral, rectal or parenteral administration.

Where the compositions are intended for rectal administration, the pharmaceutical carrier will generally include a suppository base such as cocoa butter or a glyceride of appropriate melting point. Where the compositions are intended for parenteral administration, e.g., as injectable preparations or as infusions, the pharmaceutical carrier is preferably sterile, pyrogen-free water or a parenterally acceptable oil or oily emulsion and may include dispersing agents, suspending agents, physiological salts etc.

Where the diazolones are to be administered by the oral route, they may for this purpose be associated with a suitable orally-acceptable carrier which may be liquid, syrupy or solid. Thus, for example the compounds may be made up in an aqueous medium in the form of suspension, emulsion or like formulation, said formulation if desired also containing such adjuvants as suspending agents, dispersing agents, flavoring agents, sweetening agents and the like. One may also with advantage prepare solid formulations, for example, powders, tablets, capsules, sachets and like formulations, in which the compounds are in association with a solid carrier. In particular one may provide tablets containing the active compounds, in which the compounds are in association with a suitable tablet adjuvant, which base may include such constituents as sugars, e.g., lactose, tablet disintegrating agents, e.g., pectin, tablet lubricants, e.g., magnesium stearate and binders such as starch and the like. Capsules, pills, dragees, powders and granules may also be prepared.

It is preferred that the compositions according to the invention should be in dosage unit form, that is in the form of units containing a predetermined quantity of the compound or compounds according to the invention. The daily dose of the oxadiazolones and oxadiazol-5-thiones according to the invention will in general be similar to that of the parent compound although reduced irritation makes higher doses possible. In some cases, for example in the case of the ketones and thioketones of oxadiazolyl derivatives of PAS and their N-acetyl derivatives, the stability of the compound of the invention is greater than that of the parent compound and a lower dose may be given. Thus the oxadiazolone prepared from PAS-hydrazide has been administered in conjunction with INH at 500 to 10,000 mg. daily per os whereas PAS itself is normally administered at 15 to 20 g. per day per os.

This compound, namely 2-(2'-hydroxy-4'-aminophenyl)-1,3,4-oxadiazolone, is preferably administered in dosage units containing 50 to 250 mg. of active substance. Its N-acetyl derivative and its thioanalogue, 2-(2'-hydroxy-4'-aminophenyl)-1,3,4-oxadiazol-5-thione are preferably formulated within the same range.

2-(2'-hydroxyphenyl)-1,3,4-oxadiazolone may be administered at levels similar to those used with aspirin although the maximum dose is higher due to its lower irritance. The daily dose is preferably between 250 and 7,500 mg and dosage units preferably contain between 50 and 1,500 mg. of this substance. In general the diazolones of the invention possessing marked antiphlogistic, antipyretic and analygetic activity, namely those not possessing amino groups, may be administered at the same daily dose level and in the same preferred unit dosages as 2-(2'-hydroxyphenyl)-1,3,4-oxadiazolone. 2-(2',6'-dihydroxyphenyl)-1,3,4-oxadiazolone is especially active, however, and daily dosages as low as 250 mg. in unit dosages as low as 25 mg. may be indicated.

In order that the invention may be well understood, the following examples are given by way of illustration only:

EXAMPLE 1

*Preparation of 2-(2'-Hydroxy-4'-Amino)-Phenyl 1:3:4-Oxadiazolone*

The starting material for the preparation of the above compound was p-nitro-salicylic acid which was prepared according to the method of McGhie, J.S.C.I., 68, 329 (1949).

The compound was first converted to its methyl ester in the following manner:

19 grams of p-nitro-salicylic acid (M.P. 228–230° C.) in 200 mls. of absolute methanol, saturated with dry hydrogen chloride, was heated for one hour on a water bath under reflux and evaporated to dryness under reduced pressure. The resulting methyl ester, crystallised from absolute methanol, was obtained in a yield of 19 grams. M.P. 101–102° C.

The compound was then converted to the hydrazide thereof by the following method:

100 grams of the methyl ester was heated for 5 minutes on a steam bath with stirring with 200 mls. of 100% hydrazine hydrate, the excess hydrazine being removed as quickly as possible under reduced pressure without further excessive heating. The residue was dissolved in aqueous ammonia, filtered, and the filtrate acidified with concentrated hydrochloric acid to a pH of 6. The precipitate was filtered and recrystallised from dioxan and ethanol if necessary. A yield of 97 grams of the product was obtained, its M.P. being 224–226° C. (decomp. 227°).

Calculated for $C_7H_7O_4N_3$: C=47.7%; H=3.55%; N=21.35%.

Found: C=42.79%; H=3.78%; N=21.42%.

This hydrazide was then converted to the oxadiazolone by the following method:

10 grams of the hydrazide was dissolved in 200 cc. of pure dioxan and phosgene passed in a rapid stream through the hot filtered solution. The first formed precipitate almost completely dissolved after 1–2 hours. The dioxan was removed under reduced pressure, the residue dissolved in ammonia, filtered and the pH adjusted to 1 with concentrated hydrochloric acid. The precipitate was filtered and dried at 100° C. Yield 9.5 grams, M.P. 245–247° C. (decomp.).

Calculated for $C_8H_5O_5N_3$: C=43.00%; H=2.24%; N=18.84%.

Found: C=43.19%; H=2.21%; N=18.9%.

The above oxadiazolone was reduced to the p-amino-derivative in the following manner:

9.0 grams of the above p-nitro derivative was suspended in 80 mls. of distilled water and 60 mls. of concentrated hydrochloric acid containing 40 grams of tin powder and stirred overnight. A further 50 mls. of concentrated hydrochloric acid was added together with 20 grams of tin powder, the mixture then being warmed to 100° C. for 10 minutes, filtered hot and washed with concentrated HCl. The reaction mixture was then left at 0° C. for 24 hours when white plates precipitated, M.P. 278° C. (decomp.), yield=8.2 grams.

Calculated for $C_8H_8O_3N_3Cl$: C=49.9%; H=3.5%; N=20.1%. Found: C=42.08%; H=3.43%; N=20.32%.

The above reduction may also be effected by using an Adams catalyst.

EXAMPLE 2

2-(2'-Hydroxy-4'-Nitrophenyl)-1:3:4-Oxadiazol-5-Thione

The hydrazide of p-nitro-salicylic acid, prepared as above, may be converted to the oxadiazol-5-thione in the following manner:

2.0 grams of the hydrazide in 150 ml. of pure dioxan, is filtered hot and 2.0 grams of thiophosgene in 5 ml. of dioxan is added thereto with stirring. A slight cloudiness occurred which cleared up. The dioxan was removed under reduced pressure, and the residue taken up in dilute aqueous ammonia, filtered and the pH adjusted to 3 with concentrated hydrochloric acid. The precipitate obtained was filtered and dried at 100° C. Yield=1.9 gram; M.P. 190–193° (no decomp.).

N (calculated for $C_8H_5O_4SN_3$)=17.55%;
N (found)=17.72%.

The above compound was reduced to the paramino derivative as follows:

3.0 grams of the para-nitro derivative, was suspended in 50 mls. of distilled water and 50 mls. of concentrated hydrochloric acid together with 20 grams of tin powder, with stirring. The mixture was left overnight with constant stirring and then heated to 100° C. for 10 minutes and filtered hot. Crystals of the hydrochloride separated in a yield of 100 milligrams. The filtrate was brought to pH 5 with ammonia and the free base precipitated. Yield 1 gram. The free base has an M.P. of 234–235° C. (decomp.), whilst the hydrochloride has no sharp melting point but become soft at 250° C.

The use of an Adams catalyst for the reduction of the nitro compound is not to be recommended because of the risk of sulphur poisoning of the catalyst.

EXAMPLE 3

Phosgene gas was passed into 200 mls. absolute dioxan until ca. 10 gms. have been absorbed, then a solution of 1.0 gm. PAS-hydrazide in 100 mls. dioxan was added slowly with vigorous stirring at room temperature. A slight precipitate was formed. After allowing to stand for 15 minutes, the dioxan was distilled off under reduced pressure and the residue warmed with 60 mls. 1 N HCl for 10 minutes on the water bath. The mixture was then boiled for 1 minute and filtered and to the filtrate 100 ml. conc. HCl added. After a few minutes fine crystals of the hydrochloride of 2-(2'-hydroxy-4'-aminophenyl),1,3,4-oxadiazolone appeared, yield 1 gm., M.P. above 270° C.

EXAMPLE 4

Gaseous phosgene was passed into 300 mls. dry dioxan until 27 gms. had been dissolved. With vigorous stirring of the dioxan-phosgene solution a solution of 10 gm. PAS-hydrazide in 250 mls. dry dioxan was slowly dropped in at room temperature. After standing 20 minutes the dioxan was distilled off under reduced pressure and the residue treated with 250 mls. 1 N HCl on the water bath for 30 minutes, then boiled 1 minute and filtered. The filtrate was then added to 250 mls. conc. HCl whereupon 2-(2'-hydroxy-4'-aminophenyl)-1,3,4-oxadiazolone hydrochloride crystallised in characteristic form. Yield: 4.3 gm. M.P. above 270° C.

Calculated: C, 41.9%; H, 3.5%; N, 18.3%. Found: C, 42.1%; H, 3.4%; N, 18.2%.

EXAMPLE 5

(a) Preparation of Salicylic Acid Hydrazide 250 gm. methyl salicylate and 200 ml. hydrazine hydrate (98–100%) were heated for 1 hour at 100° C. with occasional stirring on the steam bath. One phase was rapidly formed. The mixture was allowed to stand overnight at room temperature and crystallised to a solid mass. The excess hydrazine hydrate was then distilled off at 10 mm. Hg and recovered for re-use.

The residue was suspended in hot water (ca.1 liter) and conc. HCl added until solution occurred, filtered the pH adjusted to just 6 with $NH_3$ and the mixture cooled to 0° C. overnight and filtered. White crystals, dried at 100° C., M.P. 140–143°. Yield of desired product=260 gm.

(b) Preparation of 2-(2'-Hydroxyphenyl-1,3,4-Oxadiazolone

Salicylic acid hydrazide (M.P. 139–142° C.) 45 gm. was dissolved in dioxan (absolute) 300 ml. in the hot and filtered. Phosgene was then passed through at 70–90° C.; there was a precipitate formed immediately which tended to cake in phosgene inlet line but which gradually dissolved on heating and passing further phosgene. When the solution was almost clear, it was allowed to stand overnight at room temperature, the dioxan distilled off at 10 mm. Hg, the residue taken up in hot water to which $NH_3$ (0.88) had been added in just sufficient quantity to effect solution and then filtered hot. The pH was adjusted with conc. HCl to 1 and the precipitate filtered and dried at 100° C. Yield 40 gm. desired product, M.P. 194–196° C. Further crystallisation from methanol gives a substance, M.P. 199–200° C., fine white powder.

(c) Preparation of the Diacetate of 2-(2'-Hydroxyphenyl)-1,3,4-Oxadiazolone 5.0 gms. 2-(2'-hydroxyphenyl) - 1,3,4 - oxadiazolone M.P. 194–196° C. and 30 mls. acetic anhydride were heated under reflux during 8 hours, then excess acetic anhydride removed by distillation in vacuo and the residue crystallised from ethanol. Yield of desired product=5.0 gms. M.P. 119–122° C.

EXAMPLE 6

(a) *Preparation of Methyl γ-Resorcylate*

20 gms. γ-resorcylic acid, M.P. 140–142° C., were dissolved in 200 mls. absolute methanol saturated with dry hydrogen chloride, refluxed for 1 hour, and the solvent then removed under reduced pressure. The residue was taken up in 200 mls. absolute methanol again and resaturated with dry HCl and refluxed for 1 hour. The whole process was repeated once again. The residue was treated with excess aqueous sodium bicarbonate solvents, extracted three times with ether, the ether distilled off and the residue crystallised from methanol and water. Yield 15 gms. of the desired product, M.P. 51–55° C.

(b) *Preparation of γ-Resorcylic Acid Hydrazide*

15 gms. methyl γ-resorcylate and 40 mls. hydrazine hydrate 98–100% were heated for 10 minutes on the steam bath and excess hydrazine hydrate was then removed under reduced pressure. The residue was taken up in a little hot ethanol, 100 mls. water added and the pH adjusted with conc. HCl to 7. The hydrazide crystallised slowly at 0° C. M.P. 214–217° (decomp.). Yield=11 gms. of desired product.

(c) *Preparation of 2-(2',6'-Dihydroxyphenyl)-1,3,4-Oxadiazolone*

9.8 gms. γ-resorcylic acid hydrazide were dissolved in 500 mls. absolute dioxan and filtered hot. Phosgene was passed in for 10 minutes at 100° C. No precipitate formed. Dioxan was distilled off under reduced pressure and the residue was taken up in 100 mls. dilute aqueous ammonia, treated with charcoal and filtered directly into excess 10% HCl. The product was soluble and crystallised slowly at 0° C. and was washed with cold water. Yield of desired product=7.7 gms., M.P. 240–242° (decomp.).

Found: N=14.4%. Calculated: N=14.6%.

EXAMPLE 7

(a) *Preparation of Methyl 2,5-Dihydroxy Benzoate*

9.3 gms. 2.5 dihydroxy benzoic acid and 100 mls. absolute methanol saturated with dry hydrogen chloride were heated for 2 hours under reflux. The excess methanol was then distilled off, the last traces under reduced pressure and the residual white crystals crystallised from aqueous methanol. Yield of desired product=7.3 gms., M.P. 84–85° C.

(b) *Preparation of 2,5-Dihydroxybenzoic Acid Hydrazide*

6.0 gms. methyl 2,5-dihydroxy-benzoate, M.P. 84–85° C., and 25 mls. hydrazine hydrate 98–100% were warmed to 60–70° C. and then evaporated to dryness in vacuo. The residue was dissolved in trace of ethanol and 150 mls. water and the pH was adjusted to 5. After standing at 0° C. crystals separated slowly and were filtered off after 2 hours. Yield of desired product=6.0 gms. M.P.=207° (melts), 211° (decomp.)

(c) *Preparation of 2-(2,5'-Dihydroxyphenyl)-1,3,4-Oxadiazolone*

4.0 gms. 2,5-dihydroxybenzoic acid hydrazide were dissolved in 100 mls. hot absolute dioxan and phosgene was passed in. A precipitate was formed which dissolved on further passage of phosgene. Dioxan was distilled off under reduced pressure and the residue taken up in a trace of ethanol and aqueous ammonia and then filtered directly on to 200 mls. conc. HCl and 200 mls. water. Crystals appeared slowly at 0° C. and were washed with a little ice cold water. Yield=2.1 gms. of desired product, M.P.–224° C. (decomp.). Found: N=14.4%. Calculated: N=14.6%.

EXAMPLE 8

(a) *Preparation of 2,6-Dihydroxy-3,5-Dichloro-4-Methylbenzoic Acid Hydrazide*

13.1 gms. methyl 2,6-dihydroxy-3,5-dichloro-4-methyl benzoate, M.P. 164–166° C., and 75 mls. hydrazine hydrate 98–100% were heated for 30 minutes on a steam bath and excess hydrazine hydrate distilled off under reduced pressure. The residue was treated with 500 mls. hot aqueous ammonia (very insoluble) and the pH adjusted to 6 and filtered. Yield=11.6 gms. of desired product, M.P. 240–241° C. (decomp).

(b) *Preparation of 2-(2',6'-Dihydroxy-3',5'-Dichloro-4'-Methyl-Phenyl)-1,3,4-Oxadiazolone*

2.0 gms. hydrazide from (a) above were added to a mixture of 100 mls. water and 100 mls. glacial acetic acid. The hydrazide was not soluble even in the hot Dioxan was added until the hydrazide was just soluble in the cold (10–20 mls. dioxan) and phosgene was then passed in the cold. After 20 min. shining brownish red crystals formed and were filtered and washed with a little ice cold water. Yield of desired product=1.8 gms. M.P. soft 228° C., decomp. 246° C. Found: N=10.1. Calc.: N=10.3.

EXAMPLE 9

(a) *Preparation of 2,6-Dihydroxy-4-Benzylbenzoic Acid Hydrazide*

5.3 gms. methyl 2,6-dihydroxy-4-benzyl-benzoate, S.P. 83–85° C., and 50 mls. hydrazine hydrate 98–100% were heated for 30 minutes on a steam bath and then evaporated in vacuo to dryness. The residue was taken up in a little warm methanol, 100 mls. water added and the pH adjusted to 7 with conc. HCl and filtered. Yield of desired product=5.4 gms. M.P. 191–5° C.

(b) *Preparation of 2-(2',6'-Dihydroxy-4'-Benzyl-Phenyl)-1,3,4-Oxadiazolone*

4.3 gms. 2,6-dihydroxy-4-benzyl-benzoic acid hydrazide, M.P. 191–5° C., and 100 mls. warm dioxan were filtered and phosgene was passed in at room temperature during 15 minues. No precipitation occurred. Solvent was removed under reduced pressure and the residue dissolved in dilute aqueous ammonia (warm) and filtered into excess 10% HCl. The product was filtered and washed well with distilled water. Yield of desired product=4.0 gms. M.P. soft 212° C., decomp. 228–30° C. Found: N=9.9%. Calc.: N=10.1%.

EXAMPLE 10

(a) *Preparation of 2-Hydroxy-3-Methyl-Benzoic Acid Hydrazide*

2.6 gms. 2-hydroxy-3-methyl-benzoic acid, 100 mls. methanol (absolute) and 5 mls. conc. $H_2SO_4$ were refluxed for 3 hours and excess methanol was distilled off under reduced pressure. The residue was treated with excess sodium bicarbonate and 200 mls. water to pH 7, extracted 4 times with ether and dried over $Na_2SO_4$. The ether was distilled off leaving an oil, which was treated with 50 mls. hydrazine hydrate 98–100% on the steam bath for 15 minutes. Excess hydrazine hydrate was distilled off under reduced pressure and the residue dissolved in warm aqueous $NH_3$ (100 mls.) The pH was adjusted to 7 with conc. hydrochloric acid and the crystals filtered, M.P. 182–6° C. Yield of desired product 1.3 gms.

(b) *Preparation of 2-(2'-Hydroxy-3'-Methyl-Phenyl)-1,3,4-Oxadiazolone*

1.3 gms. 2-hydroxy-3-methyl-benzoic acid hydrazide are dissolved in 100 mls. absolute dioxan and excess phosgene passed through in the cold. No precipitation occurred. Dioxan was distilled off under reduced pressure and the solid residue taken up in dilute aqueous ammonia and filtered in to excess 10% HCl. The crystals were filtered off and washed with water. Yield of desired product=1.3 gms. M.P. 175–176° C. Found: N=14.82%. Calc.: N=14.63%.

EXAMPLE 11

(a) *Preparation of 2-Hydroxy-5-Chloro-Benzoic Acid Hydrazide*

7.5 gms. methyl 2-hydroxy-5-chloro-benzoate, M.P. 35–40° C., and 20 mls. hydrazine hydrate 98–100% were heated for 30 minutes at 100° C. on a steam bath and then evaporated to dryness in vacuo. The residue was taken up in trace of ethanol and 100 mls. water (hot). The pH was adjusted to 7 with HCl. After 2 hours at 0° C. crystals were filtered off; yield of desired product=6.6 gms. M.P. 208–210°.

(b) *Preparation of 2-(2'-Hydroxy-5'-Chloro-Phenyl)-1,3,4-Oxadiazolone*

5.0 gms. 2-hydroxy-5-chloro-benzoic acid hydrazide, M.P. 208–210° C., in 100 mls. absolute dioxan are filtered and excess phosgene was passed in the cold. A precipitate was formed which dissolved with further passage of phosgene. Dioxan was distilled off under reduced pressure and the residue crystallised from ethanol to give a white powder. Yield=4.0 gms. of desired product, M.P.=236–239° C.

EXAMPLE 12

(a) *Preparation of Methyl p-Amino-Salicylate*

100 gms. PAS monohydrate, 1 liter methanol (absolute) and 110 mls. conc. $H_2SO_4$ were refluxed for 12 hours. Excess methanol was distilled off on an oil bath at 110–120° C. and the residue was poured on to excess $NaHCO_3$ suspended in 1 liter water. The pH was 7 at the end of the reaction. The methyl ester was filtered off and crystallised from methanol. Yield of desired product=84 gms. M.P. 116–119° C.

(b) *Preparation of Methyl p-Acetamido-Salicylate*

Methyl p-amino salicylate 83.5 gms. was dissolved in 150 mls. pyridine with stirring and 50 gms. acetyl chloride were slowly dropped in over 1 hour. Pyridine was distilled off under reduced pressure. The residue was taken up in hot ethanol and poured into 1 liter water filtered after 1 hour and crystallised from methanol. Yield of desired product=88.0 gms. M.P. 144–146° C.

(c) *Preparation of p-Acetamido Salicylic Acid Hydrazide Hydrochloride*

30 gms. methyl p-acetamido salicylate, M.P. 141–144° C., and 70 mls. hydrazine hydrate 98–100% were allowed to react together at room temperature until the salicylate completely dissolved (40–60 min.). The hydrazine hydrate was then lyophilised off at approx. 0° C. under high vacuum, using a dry ice trap for hydrazine hydrate recovery. One liter water was then added to the residue at 80–90° C. and conc. HCl added dropwise until solution just occurred (35 mls. conc. HCl). The solution was filtered, 200 mls. conc. HCl were added to the cooled filtrate and mixture was cooled to 15° C. After 1 hour the crystals were filtered off and dried at 100° C. M.P. 249–251° C. (decomp.); yield of desired product=34 gms.
Found: N=17.1%. Calculated: N=17.0%.

(d) *Preparation of 2-(2'-Hydroxy-4'-Acetamido-Phenyl)-1,3,4-Oxadiazolone*

1.0 gms. p-acetamido salicylic acid hydrazide hydrochloride, M.P. 249–251° C. (decomp.), was dissolved in 20 mls. glacial acetic acid and 20 mls. warm water and 60 mls. water were added to give a clear solution. Phosgene was passed through for 10 minutes and the precipitate filtered after standing for 30 minutes. Yield of desired product=500 mgs. M.P. 250° soft, 255° decomp.

The above product was practically insoluble in hot dilute acetic acid and the filtrate gave no precipitate with a hot aqueous solution of benzaldehyde. Under the same conditions the hydrazide hydrochloride gave a heavy precipitate with hot aqueous benzaldehyde.
Calc.: N=17.9%. Found: N=18.3%.

EXAMPLE 13

13.2 g. of PAS hydrazide were dissolved in 100 ml. N.HCl with warming and then cooled to room temperature. A rapid stream of phosgene was passed through for half an hour and the resulting solution evaporated to dryness in an open dish on a water bath. 50 ml. of water was added and brought to 95° C., filtered, and the filtrate brought to pH 2.0 with ammonia. The precipitate was filtered and dried at 100° C. Wt. 7.0 g.; M.P. 240° C. (decomp.).

Analysis: N, 19.8%; C, 48.9; H, 2.3.

EXAMPLE 14

1000 mg. PAS hydrazide were dissolved in hot dioxan 200 ml. and excess phosgene passed through. A precipitate appeared immediately which gradually dissolved up on warming and passing excess phosgene, to give a perfectly clear solution. The dioxan was then distilled off under reduced pressure and the yellowish solid residue treated on the water bath at 100° C. with 100 mls. N aq. HCl. There was a slight effervescence. The mixture was then filtered and to the filtrate 100 mls. conc. HCl added. A cream coloured powder appeared which was filtered off. Yield: 550 mgs., M.P. brown 250°, soft 253°, decomp. 254°. Mixed M.P. with hydrochloride of 2-(2'-hydroxy-4'-aminophenyl)-1,3,4-oxadiazolone obtained from p-nitro salicylic acid, brown 250°, soft 253°, decomp. 254°. M.P. hydrochloride of 2-(2'-hydroxy-4'-aminophenyl)-1,3,4-oxadiazolone obtained from p-nitro-salicylic acid: white glistening plates, brown 250°, soft 290°, no rapid decomp. even at 300°. This method gives a somewhat impure substance, but one which shows almost as high an activity against $H_{37}Rv$ as the pure product.

According to the present invention we also provide the following examples by way of illustration only, of compositions according to the invention.

COMPOSITION 1.—TABLETS (a) 400 g. 2-(2'-hydroxy-4'-amino phenyl)-1,3,4-oxadiazolone are mixed with 80 g. starch and compressed in a high compression tabletting machine into tablets of approx. wt. 300 mg. These tablets are then granulated through a 20 mesh sieve with the addition of 2% by weight of talc or magnesium stearate and recompressed in a standard rotary tabletting machine to give tablets of weight 480 mg.

(b) 200 g. 2-(2'-hydroxy-4'-amino-phenyl)-1,3,4-oxadiazolone are mixed with 40 g. of starch or lactose, moistened with a 20% solution of acacia in a 10% solution of gelatine and granulated through a 20 mesh sieve. The granules are dried, mixed with 20% by weight of talc or magnesium stearate and compressed in a standard tabletting machine to give tablets weighing 480 mg.

The active material in the compositions (a) and (b) are replaced, if desired, by 2-(2'-hydroxy-4'-acetamidophenyl)-1,3,4-oxadiazolone or 2-(2'-hydroxy-4'-acetamido-phenyl)-1,3,4-oxadiazol-5-thione at the same unit dosage or by 2-(2':6'-dihydroxyphenyl)-1:3:4-oxadiazolone,2 - (2':5' - dihydroxyphenyl)-1:3:4-oxadiazolone, 2-(2':6'-dihydroxy-3':5-dichloro-4'-methyl-phenyl) - 1:3:4-oxadiazolone, 2-(2':6-dihydroxy-4-benzyl-phenyl)-1:3:4-oxadiazolone, 2-(2'-hydroxy-3'-methyl-phenyl)-1:3:4-oxadiazolone or 2-(2'-hydroxy-5-chloro-phenyl-1:3:4-oxadiazolone at a unit dosage of 240 mg.

COMPOSITION 2.—SUPPOSITORIES (a) 5 g. of 2-(2'-hydroxy-4'-amino-phenyl)-1,3,4-oxadiazolone are incorporated into 25 g. of melted theobroma oil (cocoa butter) and the mass poured into suppository moulds to give suppositories weighing 2500 mg.

(b) 10 g. of 2-(2'-hydroxy - 4' - amino-phenyl)-1,3,4-oxadiazolone are incorporated into 50 g. of melted white beeswax and the mass poured into suppository moulds to give suppositories weighing 2500 mg. grains. These suppositories are particularly suitable for tropical use.

The active material in the above suppositories may be replaced, if desired, by 2-(2'-hydroxy - 4' - acetamidophenyl) - 1,3,4 - oxadiazolone, 2-(2'-hydroxy - 4' - aminophenyl)-1,3,4-oxadiazol - 5 - thione, 2-(2':6'-dihydroxyphenyl) - 1:3:4 - oxadiazolone, 2(2':5'-dihydroxyphenyl)-1:3:4 - oxadiazolone, 2-(2':6' - dihydroxy - 3:5' - dichloro - 4' - methyl-phenyl)-1:3:4-oxadiazolone, 2-(2':6'-dihydroxy - 4' - benzyl-phenyl) - 1:3:4 - oxadiazolone, 2-(2'-hydroxy - 3' - methyl-phenyl) - 1:3:4 - oxadiazolone or 2-(2'-hydroxy - 5' - chloro-phenyl) - 1:3:4 - oxadiazolone at the same unit dosage.

EXAMPLE 15

*Reaction of PAS-Hydrazide With Diethyl Carbamyl Chloride*

1.67 gms. PAS-hydrazide and 25 mls. pure pyridine warmed until solution then cooled to room temperature. 1.4 gms. diethyl carbamyl chloride added slowly at room temperature with agitation and the resultant solution refluxed in a brisk stream of nitrogen during 3.5 hours. Diethylamine was evolved. The pyridine was distilled off under reduced pressure and the oily residue warmed with 50 mls. 1 N HCl for 5 mins. and then 10 mls. conc. HCl added and the mixture cooled to room temperature. A buff coloured precipitate was formed. Yield 1.1 gm. M.P. 200–212° C. with decomposition. This impure yield was then boiled with 50 mls. 1 N HCl for 5 minutes, filtered hot and to the filtrate 30 mls. conc. HCl added and the solution cooled to room temperature. A fine cream coloured precipitate slowly appeared. M.P. 250–258° (with decomp.). Yield approx. 10 mgs.

EXAMPLE 16

*Preparation of 2-(2' - Hydroxy - 4' - Acetamidophenyl)-1,3,4-Oxadiazolone*

2.46 gms. N-acetyl PAS-hydrazide hydrochloride dissolved in 50 mls. pure pyridine and 1.5 gms. diethylcarbamyl chloride added slowly with agitation at room temperature. The solution was then refluxed while passing a brisk stream of nitrogen during 3.5 hours. Ethylamine was evolved during the refluxing and a small amount was still being evolved when the refluxing was stopped. The pyridine was distilled off under reduced pressure and the residue taken up in a small amount of water together with a trace of ammonia and filtered on to excess dilute aqueous HCl. A buff coloured precipitate was formed which was filtered after 10 mins. at room temperature. Yield=0.8 gm. M.P. 253–254° (with decomposition). Mixed melting point with authentic sample 253–4° C. (decomposition).

EXAMPLE 17

*Preparation of 2-(2':4' - Dihydroxy-Phenyl) - 1,3,4-Oxadiazolone*

The methyl ester of 2:4 dihydroxybenzoic acid was prepared in the same way as for the other benzoic acid derivatives by dissolving the carboxy acid in excess methanol and saturating with HCl, refluxing, distilling off excess methanol, treating with aqueous bicarbonate and extracting with water.

18 gm. methyl 2:4-dihydroxybenzoate were treated with 100 mls. hydrazine hydrate 98–100% and heated 10 mins. on the water bath. The excess hydrazine was distilled off under reduced pressure, the residue dissolved in a small amount of methanol, filtered and treated with water and a little HCl to adjust the pH to 7. Fine white crystals appeared. M.P. 240–242° (with decomposition); yield 14.1 gm. of the desired product.

2.5 gms. 2:4 dihydroxybenzoic acid hydrazide dissolved in 100 mls. absolute dioxan and phosgene gas passed for 15 mins. at room temp. in a brisk stream. No precipitate occurred. The dioxan was removed under reduced pressure, the residue taken up in 50 mls. ethanol with warming and the whole poured on to 100 mls. dilute HCl. On scratching, crystals appeared and were filtered off after 1 hour at 0° C. Yield of desired product: 2.2 gms. Melting point 263° C. (soft), 278° C. (decomposition). Mixed melting point with authentic sample 210°–230° (decomposition).

I claim:

1. A compound selected from the group consisting of a compound of the formula

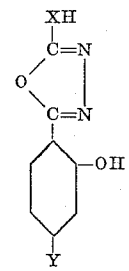

wherein X is a member selected from the group consisting of oxygen and sulphur atoms and Y is a member selected from the group consisting of amino, lower alkanoylamido and benzoylamido; a physiologically acceptable acid addition salt of the compounds of the formula in which Y is amino; and tautomers of the aforementioned compounds.

2. 2-(2'-hydroxy - 4' - amino-phenyl)-1:3:4-oxadiazolone.

3. 2-(2'-hydroxy - 4' - amino-phenyl)1:3:4-oxadiazol-5-thione.

4. 2(2'-hydroxy - 4' - acetylamino-phenyl)-1:3:4-oxadiazolone.

5. Physiologically acceptable acid addition salts of 2-(2'-hydroxy - 4' - amino-phenyl)-1:3:4-oxadiazolone.

6. Physiologically acceptable acid addition salts of 2-(2'-hydroxy - 4' - amino-phenyl) - 1:3:4 - oxadiazol-5-thione.

References Cited in the file of this patent

UNITED STATES PATENTS 2,894,972     Bloom et al. _____ July 14, 1959

OTHER REFERENCES

Elderfield: Heterocyclic Compounds, vol. 7, pp. 528–9 (1961).

Yoshida et al.: Chem. Abstracts, vol. 52, col. 15595 (1948).

Baron et al.: J. Org. Chem., vol. 23, pp. 1021–3 (1958).